(12) United States Patent
Ding et al.

(10) Patent No.: US 10,969,613 B1
(45) Date of Patent: Apr. 6, 2021

(54) FINGERPRINT IDENTIFICATION DISPLAY DEVICE AND DRIVING METHOD THEREOF

(71) Applicant: BOE TECHNOLOGY GROUP CO., LTD., Beijing (CN)

(72) Inventors: Xiaoliang Ding, Beijing (CN); Haisheng Wang, Beijing (CN); Yingming Liu, Beijing (CN); Rui Xu, Beijing (CN); Wei Liu, Beijing (CN); Pengpeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 557 days.

(21) Appl. No.: 15/777,412

(22) PCT Filed: Sep. 26, 2017

(86) PCT No.: PCT/CN2017/103388
§ 371 (c)(1),
(2) Date: May 18, 2018

(87) PCT Pub. No.: WO2018/161541
PCT Pub. Date: Sep. 13, 2018

(30) Foreign Application Priority Data

Mar. 10, 2017 (CN) .......................... 201710142978.5

(51) Int. Cl.
*G06F 3/042* (2006.01)
*G02F 1/1333* (2006.01)
(Continued)

(52) U.S. Cl.
CPC ........ *G02F 1/13338* (2013.01); *G02F 1/1343* (2013.01); *G02F 1/133524* (2013.01);
(Continued)

(58) Field of Classification Search
USPC ... 345/175, 613, 156, 165, 166, 207, 32, 48, 345/84, 87; 382/124; 358/509
See application file for complete search history.

(56) References Cited

U.S. PATENT DOCUMENTS

| 2003/0183019 | A1 | 10/2003 | Chae |
| 2004/0252867 | A1* | 12/2004 | Lan ...................... G06K 9/0004 382/124 |

(Continued)

FOREIGN PATENT DOCUMENTS

| CN | 104881196 A | 9/2015 |
| CN | 105702176 A | 6/2016 |

(Continued)

OTHER PUBLICATIONS

First Office Action issued in Chinese Application No. 201710142978.5 dated Apr. 3, 2018, with English translation.
(Continued)

*Primary Examiner* — Thuy N Pardo
(74) *Attorney, Agent, or Firm* — McDermott Will & Emery LLP

(57) ABSTRACT

A fingerprint identification display device, includes: a display panel having a plurality of display units defined therein, and at least some of the plurality of display units are located in a fingerprint identification region, each of which comprises display subpixels and an identification subpixel; a light guide plate; one or more light emitting components configured to make detection light emitted therefrom travel in the light guide plate in a total reflection manner; a first polarizer comprising a first region and a second region with perpendicular polarization directions, and a second polarizer comprising a third region and a fourth region with perpendicular polarization directions, wherein the first region and the third region correspond to the display subpixels and have perpendicular polarization directions, and the second region
(Continued)

and the fourth region correspond to the identification subpixel; and a photosensitive sensing unit disposed at the second polarizer, and corresponding to the identification subpixel.

14 Claims, 3 Drawing Sheets

(51) Int. Cl.
*G06K 9/00* (2006.01)
*G02F 1/1343* (2006.01)
*G02F 1/1335* (2006.01)

(52) U.S. Cl.
CPC ..... *G02F 1/133528* (2013.01); *G06K 9/0004* (2013.01); *G02F 1/133548* (2021.01)

(56) References Cited

U.S. PATENT DOCUMENTS

| | | | | |
|---|---|---|---|---|
| 2008/0062156 A1* | 3/2008 | Abileah | ............... | G02F 1/13338 345/204 |
| 2008/0084374 A1* | 4/2008 | Abileah | ............... | G06F 3/0412 345/87 |
| 2009/0028396 A1* | 1/2009 | Kishima | ............... | A61B 5/1172 382/124 |
| 2013/0120760 A1 | 5/2013 | Raguin et al. | | |
| 2016/0156857 A1* | 6/2016 | Hu | ............... | H04N 1/00347 358/509 |
| 2016/0342282 A1* | 11/2016 | Wassvik | ............... | G02F 1/13338 |
| 2017/0147850 A1* | 5/2017 | Liu | ............... | G06F 3/0412 |
| 2017/0178294 A1* | 6/2017 | Surazhsky | ............... | G06T 7/521 |
| 2017/0316248 A1* | 11/2017 | He | ............... | G01L 1/142 |
| 2017/0337413 A1* | 11/2017 | Bhat | ............... | G06K 9/00087 |
| 2018/0005005 A1* | 1/2018 | He | ............... | G06K 9/0004 |
| 2018/0096188 A1 | 4/2018 | Xu | | |
| 2018/0260602 A1* | 9/2018 | He | ............... | A61B 5/1495 |
| 2020/0342194 A1* | 10/2020 | Bhat | ............... | A61B 5/1172 |

FOREIGN PATENT DOCUMENTS

| | | |
|---|---|---|
| CN | 106067018 A | 11/2016 |
| CN | 106228144 A | 12/2016 |
| CN | 106339682 A | 1/2017 |
| CN | 106773229 A | 5/2017 |

OTHER PUBLICATIONS

International Search Report and Written Opinion issued in International Application No. PCT/CN2017/103388 dated Jan. 4, 2018, with English translation.

* cited by examiner

FINGERPRINT IDENTIFICATION DISPLAY DEVICE AND DRIVING METHOD THEREOF

CROSS-REFERENCE TO RELATED APPLICATION

This application is a national phase entry under 35 USC 371 of International Patent Application No. PCT/CN2017/103388 filed on Sep. 26, 2017, which claims rights and priority to Chinese Patent Application No. 201710142978.5, filed on Mar. 10, 2017 and titled "FINGERPRINT IDENTIFICATION DISPLAY DEVICE AND DRIVING METHOD THEREOF", which are incorporated herein by reference in their entirety.

TECHNICAL FIELD

The present disclosure relates to a field of display technology, and more particularly, to a fingerprint identification display device and a driving method thereof.

BACKGROUND

A principle of optical fingerprint detection is that, based on different degrees of lightness between light reflected by a position of a ridge (i.e., a bump in fingerprint lines) of a fingerprint surface and light reflected by a position of a valley (i.e., a hollow in the fingerprint lines) of the fingerprint surface, reflected optical signals with different degrees of lightness are converted by an optical sensor into electrical signals to be output, thereby performing fingerprint identification.

In an existing display device, such as a smart phone, the optical sensor is usually disposed in a frame area around a display screen, so that a screen-to-body ratio is relatively low, resulting in poor user experience. Therefore, integrating the optical sensor inside the display screen can reduce the area of a frame, a part of which is occupied by the optical sensor. It facilitates realizing a super screen-to-body ratio of a display panel, and improving the user experience.

However, due to the very small spacing between adjacent valleys or adjacent ridges of the fingerprint, crosstalk between reflection light rays received by the optical sensor easily occurs, resulting in a problem that the accuracy of fingerprint identification decreases after integrating optical fingerprint detection and display.

SUMMARY

Embodiments of the present disclosure adopt the following technical solutions: In a first aspect, some embodiments of the present disclosure provide a fingerprint identification display device, which has a fingerprint identification region. The fingerprint identification display device includes: a display panel with a liquid crystal layer packaged therein, wherein the display panel has a plurality of display units defined therein, at least some of the plurality of display units are located in the fingerprint identification region, and each of the al least some of the plurality of display units includes display subpixels and an identification subpixel; a light guide plate disposed on a display side of the display panel; one or more light emitting components configured to make detection light emitted therefrom travel in the light guide plate in a total reflection manner; a first polarizer disposed between the liquid crystal layer and the light guide plate, wherein the first polarizer includes a first region and a second region, and a polarization direction of the first region is perpendicular to a polarization direction of the second region, and a second polarizer disposed on a side of the liquid crystal layer away from the light guide plate, wherein the second polarizer includes a third region and a fourth region, and a polarization direction of the third region is perpendicular to a polarization direction of the fourth region, wherein the first region and the third region correspond to the display subpixels, the polarization direction of the first region is perpendicular to the polarization direction of the third region, the second region and the fourth region correspond to the identification subpixel, and the polarization direction of the second region is perpendicular to the polarization direction of the fourth region; and a photosensitive sensing unit disposed at a side of the second polarizer away from the liquid crystal layer and corresponding to the identification subpixel.

Optionally, the identification subpixel includes a first electrode and a second electrode, and the first electrode and the second electrode are configured to control liquid crystal molecules in the identification subpixel to deflect.

Optionally, the first polarizer is a first wire grid polarizer; an extension direction of wires in the first region is perpendicular to an extension direction of wires in the second region; the second polarizer is a second wire grid polarizer; an extension direction of wires in the third region is perpendicular to an extension direction of wires in the fourth region; and the extension direction of the wires in the second region is perpendicular to the extension direction of the wires in the fourth region.

Optionally, the first wire grid polarizer is disposed between the display panel and the light guide plate; and/or, the second wire grid polarizer is disposed on a side of the display panel away from the light guide plate.

Optionally, the one or more light emitting components comprises at least two light emitting components which are arranged on at least two opposite side edges of the light guide plate.

Optionally, the display panel includes a first substrate located on one side of the liquid crystal layer and a second substrate located on another side of the liquid crystal layer, and the first substrate includes a plurality of color resists, wherein one the plurality of color resists, which is located in the identification subpixel, is transparent.

Optionally, the fingerprint identification region is located in the whole of the display side of the display panel.

Optionally, shapes of the second region and the fourth region are circular.

Optionally, the fingerprint identification display device further includes a supporting substrate disposed on a side of the display panel away from the light guide plate, wherein the photosensitive sensing unit is disposed on the supporting substrate.

Optionally, the fingerprint identification display device further includes a backlight module disposed on a side of the photosensitive sensing unit away from the display panel.

In another aspect, some embodiments of the present disclosure further provides a driving method of the foregoing fingerprint identification display device. The driving method includes: during a fingerprint identification phase, controlling liquid crystal molecules in an identification subpixel to deflect, so that detection light, which is emitted from a position in a light guide plate corresponding to a fingerprint, irradiates a photosensitive sensing unit corresponding to the identification subpixel.

Optionally, the identification subpixel includes a first electrode and a second electrode which are configured to control the liquid crystal molecules in the identification subpixel to deflect. In this case, the step of during the fingerprint identification phase, controlling the liquid crystal molecules in the identification subpixel to deflect, so that the detection light, which is emitted from the position in the light guide plate corresponding to the fingerprint, irradiates the photosensitive sensing unit corresponding to the identification subpixel, includes: during the fingerprint identification phase, controlling a voltage between the first electrode and the second electrode, so that a polarization direction of light, passing through the identification subpixel, deflects by 90°.

Optionally, one of display subpixels includes a third electrode and a fourth electrode which are configured to control liquid crystal molecules located in the one of the display subpixels to deflect. In this case, the step of during the fingerprint identification phase, controlling the liquid crystal molecules in the identification subpixel to deflect, so that the detection light, which is emitted from the position in the light guide plate corresponding to the fingerprint, irradiates the photosensitive sensing unit corresponding to the identification subpixel, further includes: during the fingerprint identification phase, controlling a voltage between the third electrode and the fourth electrode, so that a polarization direction of light, passing through the one of the display subpixels, does not deflect.

Optionally, the driving method further includes: during a display phase, controlling the liquid crystal molecules in the identification subpixel to deflect, so that light, emitted from a backlight module, is emitted out further by passing through a second region of a first polarizer.

BRIEF DESCRIPTION OF THE DRAWINGS

In order to describe technical solutions in embodiments of the present disclosure or in the prior art more clearly, the accompanying drawings to be used in the description of embodiments or the prior art will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

Figure 1:
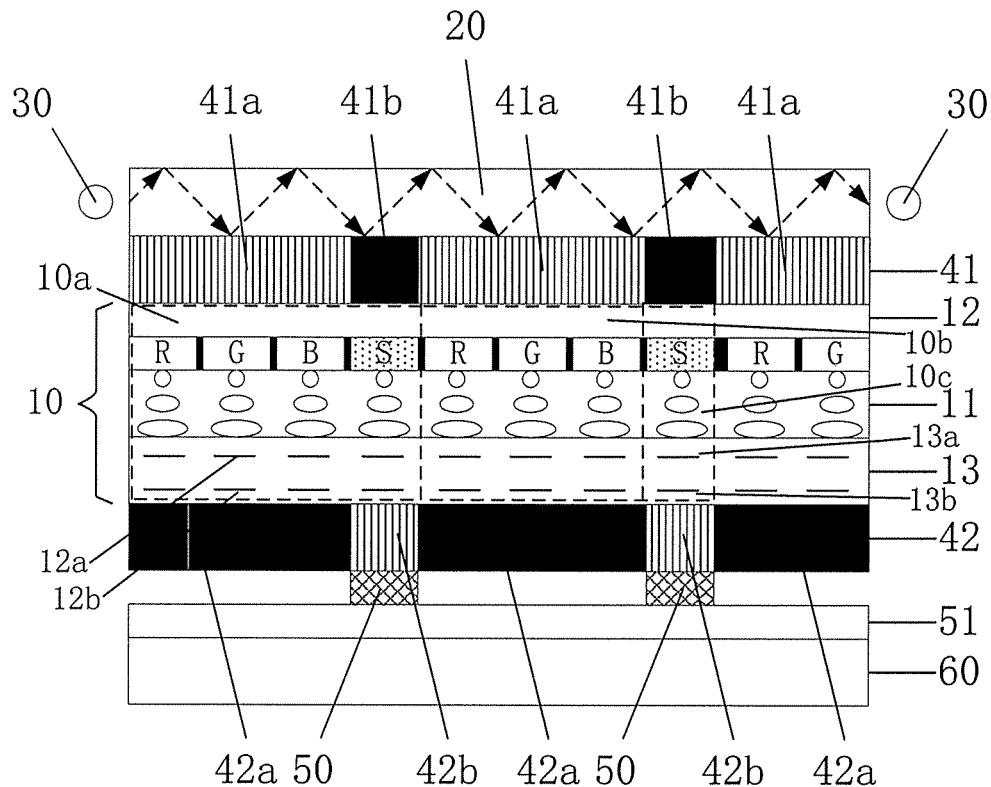
FIG. 1 is a first schematic structure diagram of a fingerprint identification display device provided by some embodiments of the present disclosure.

The technical solutions in embodiments of the present disclosure will be described clearly and completely with reference to the accompanying drawings in embodiments of the present disclosure. Obviously, the described embodiments are merely a part but not all of the embodiments of the present disclosure. All other embodiments made on the basis of embodiments of the present disclosure by a person of ordinary skill in the art without paying any creative effort shall be included in the protection scope of the present disclosure.

It needs to be pointed out that, unless otherwise defined, all terms (including technical and scientific terms) used in embodiments of the present disclosure have the same meaning as commonly understood by the person of ordinary skill in the art to which the present disclosure belongs. It should be also understood that, terms, such as those defined in typical dictionaries, should be respectively construed as having meanings consistent with their meanings in the contexts of the related arts and should not be interpreted in an idealized or overly formalized sense unless expressly so defined herein.

For example, the terms "first," "second," and the like, used in the description and claims of the present disclosure, do not denote any sequence, quantity or importance, but are only used to distinguish different parts. The use of "include" or "comprise" or the like means that an element or object preceding the word contains elements or items following the word and their equivalents, and does not exclude other elements or items. The terms of "up/over", "down/below" and the like indicate the orientation or positional relationship based on the orientation or positional relationship shown in the drawings, and is merely for simplifying the description of the technical solutions of the present disclosure, rather than indicating or implying that the device or element referred to must have a particular orientation or be constructed and operated in a particular orientation, and therefore should not be construed as limitations of the present disclosure.

In addition, since actual sizes of each pixel unit, a wire of the polarizer and the like involved in embodiments of the present disclosure are very small. For the sake of clarity, the dimension of each structure in the drawings of embodiments of the present disclosure is magnified, and does not represent an actual size or proportion.

In order to solve a problem of the prior art, some embodiments of the present disclosure provide a fingerprint identification display device and a driving method thereof. By providing a display device, in which optical fingerprint identification and display are integrated, in a collimation optical path design, crosstalk between reflection light of adjacent valleys and ridges in a fingerprint is avoided, and thus accuracy of fingerprint identification is improved.

In the foregoing display device according to some embodiments of the present disclosure, display and optical fingerprint identification are integrated. Different regions, correspondingly in an upper polarizer and a lower polarizer, or in a same polarizer but corresponding to display subpixels and an identification subpixel, have perpendicular polarization directions. By these, the design of providing a collimation optical path from a light guide plate to a photosensitive sensing unit is achieved. In this way, the crosstalk among detection light rays of the adjacent valleys and ridges in the fingerprint is avoided, and thus the accuracy of the fingerprint identification is improved.

Figure 2:
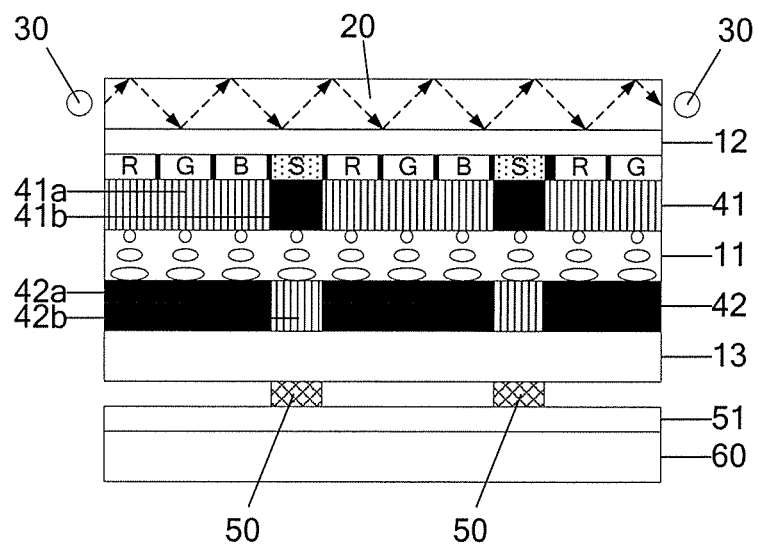
FIG. 2 is a second schematic structure diagram of a fingerprint identification display device provided by some embodiments of the present disclosure.

As shown in FIG. 1 or FIG. 2, some embodiments of the present disclosure provide a fingerprint identification display device, which has a fingerprint identification region. The fingerprint identification display device includes following structures: a display panel 10 with a liquid crystal layer 11 packaged therein, wherein at least a part of the display panel 10 has a plurality of display units defined therein, al least some of the plurality of display units 10a are located in the fingerprint identification region, and each of the al least some of the plurality display units 10a includes display subpixels 10b (marked as R/G/B in the figures) and an identification subpixel 10c (marked as S in the figures); a light guide plate 20 disposed on a display side of the display panel 10; one or more light emitting components 30 configured to make detection light emitted therefrom travel in the light guide plate in a total reflection manner (as shown by arrows in the figures); a first polarizer 41 disposed between the liquid crystal layer 11 and the light guide plate 20, including a first region 41a and a second region 41b, wherein a polarization direction of the first region 41a is perpendicular to a polarization direction of the second region 41b; a second polarizer 42 disposed on one side of the liquid crystal layer 11 away from the light guide plate, including a third region 42a and a fourth region 42b, wherein a polarization direction of the third region 42a is perpendicular to a polarization direction of the fourth region 42b, and wherein the first region 41a and the third region 42a correspond to the display subpixels 10b, the polarization direction of the first region 41a is perpendicular to the polarization direction of the third region 42a, the second region 41b and the fourth region 42b correspond to the identification subpixel 10c, and the polarization direction of the second region 41b is perpendicular to the polarization direction of the fourth region 42b; and a photosensitive sensing unit 50, disposed at a side of the second polarizer 42 away from the liquid crystal layer 11 and corresponding to the identification subpixel.

It should note that:

Firstly, the display panel 10 is generally composed of a first substrate and a second substrate which are arranged opposite to each other, and the liquid crystal layer 11 packaged between the two substrates. Taking the case that one of the first substrate and the second substrate is a color film substrate 12 and the other is an array substrate 13 as an example, the display panel 10 has a plurality of display units defined therein, and each display unit 10a of the plurality of display units is composed of a color resist in a corresponding color in the color film substrate, liquid crystal molecules in the middle, a first electrode 13a (such as a pixel electrode) and a second electrode (such as at least a part of a common electrode) in the array substrate which are configured to drive the liquid crystal molecules to deflect, and a TFT component in the array substrate.

Of course, the substrates arranged on two sides of the liquid crystal layer 11 in the foregoing display panel provided by some embodiments of the present disclosure, are also able to be a transparent cover plate and a COA substrate (full name as color filter on array substrate, i.e., array substrate with a color filter integrated thereon). In addition, the pixel electrode and the common electrode which are configured to drive the liquid crystal molecules to deflect are not limited both to be arranged in the array substrate, and the common electrode is also able to be disposed in the color film substrate.

Secondly, the fingerprint identification display device provided by some embodiments of the present disclosure has the fingerprint identification region. The region is able to be a part of the region in the display side of the display panel 10. That is, a part of the display region of the display panel 10 is a region in which display and fingerprint identification are integrated. This arrangement manner is optionally applicable to a display product having a relatively large size, such as a tablet computer. Alternatively, the region is also able to be the whole of the display side of the display panel 10. That is, the whole of the display region of the display panel 10 is the region in which display and fingerprint identification are integrated. This arrangement manner is optionally applicable to a display product having a relatively small size, such as a mobile phone, a smart watch with a display screen, or the like. Specifically, dividing for the fingerprint identification region is able to be based on actual design requirements of the display device, which is not limited in the embodiments of the present disclosure.

Thirdly, the light guide plate 20 is usually made of an acrylic material which has a refractive index greater than or equal to 1.5. Since generally the external environment has a refractive index of about 1.0, after a light ray enters the plate, the light ray emitted into the light guide plate is only able to be reflected inside the light guide plate 20 and is not able to be emitted out, i.e., a total reflection phenomenon occurs. That is, such a specular light guide plate has a light box effect.

Figure 3:
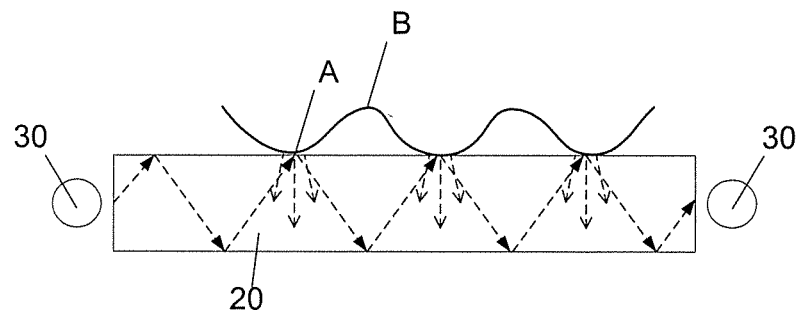
FIG. 3 is a schematic diagram of an optical path change of a total reflection light ray inside a light guide plate, after a press from a finger, in a fingerprint identification display device provided by some embodiments of the present disclosure.

Human fingers are able to be considered equivalent to a rubber material with a refractive index of about 1.5. As shown in FIG. 3, when a user's finger touches the light guide plate 20, a cover plate (usually made of glass material, a refractive index of which is also greater than 1.5) covering a surface of the light guide plate 20, or the like, each of which is a medium having a larger refractive index relative to the air, since positions of the ridges (marked as A in FIG. 3) in the fingerprint are relatively protruding, the difference between refractive indexes of the light guide plate 20 and the external environment is reduced at the positions in the light guide plate 20 corresponding to the ridges, i.e., the total reflection transmission of the detection light emitted from the one or more light emitting components 30 is damaged at these positions, so that a part of the detection light is emitted from the ridge positions and out of the light guide 20, and then is received by a photosensitive sensing unit 50 (not shown in FIG. 3); and positions of the valleys (marked as B in FIG. 3) in the fingerprint are relatively recessed, i.e., not in contact with the light guide plate 20 or another medium that covers the surface of the light guide plate 20, and it does not cause a change in the difference between the refractive indexes of the light guide plate 20 and the external environment at these positions, so it will not affect the total reflection transmission of the detection light in the region below the valley positions, so that a photosensitive sensing unit 50 therebelow will not receive the detection light.

Fourthly, from the foregoing description of the light guide plate 20, the photosensitive sensing unit 50 receives the detection light reflected by some ridge positions in the fingerprint, converts a light signal into an electrical signal, and outputs the electrical signal, so that the information corresponding to the pattern of the fingerprint is able to be obtained. The specific detection principle and the corresponding structure may follow an optical fingerprint identification system in the prior art, which will not be reiterated in the embodiments of the disclosure.

Figure 4:
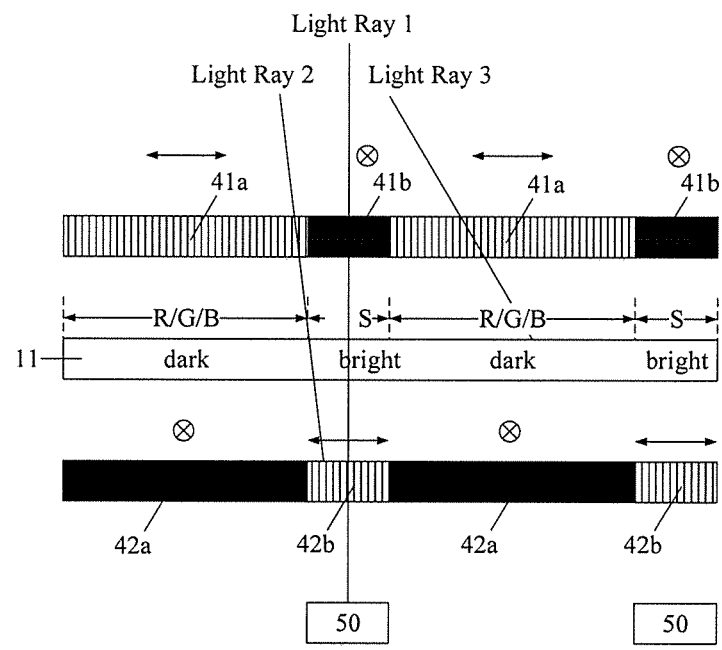
FIG. 4 is a schematic principle diagram of crosstalk, caused by light emitted from a position of adjacent valley and ridge in a fingerprint, being avoided by a fingerprint identification display device provided by some embodiments of the present disclosure.

Fifthly, the first polarizer 41 includes the first region 41a and the second region 41b, and the polarization direction of the first region 41a is perpendicular to the polarization direction of the second region 41b, means that the direction of polarized light transmitted from the first region 41a is perpendicular to the direction of polarized light transmitted from the second region 41b. For example, as shown in FIG. 4, when the polarized light transmitted from the first region 41a is in a horizontal polarization state (indicated by the symbol "↔" in FIG. 4, i.e., parallel to the paper surface direction), the polarized light transmitted from the second region 41b is in a perpendicular polarization state (indicated by the symbol "⊗" in FIG. 4, i.e., perpendicular to the paper surface direction). Similarly, the second polarizer 42 includes the third region 42a and the fourth region 42b, and the polarization direction of the third region 42a is perpendicular to the polarization direction of the fourth region 42b, also means that the direction of polarized light transmitted from the third region 42a is perpendicular to the direction of polarized light transmitted from the fourth region 42b.

Since the first region 41a of the first polarizer 41 and the third region 42a of the second polarizer 42 correspond to the display subpixels, and the polarization direction of the first region 41a is perpendicular to the polarization direction of the third region 42a, cooperating with the optical activity of liquid crystal molecules in a part of the liquid crystal layer 11 therebetween, it is able to achieve that the display subpixels display normally.

Similarly, the second region 41b of the first polarizer 41 and the fourth region 42b of the second polarizer 42 correspond to the identification subpixel, and the polarization direction of the second region 41b is perpendicular to the polarization direction of the fourth region 42b, cooperating with the optical activity of liquid crystal molecules in a part of the liquid crystal layer 11 therebetween, it is able to achieve that the detection light reflected at a ridge position of in the fingerprint sequentially passes through the second region 41b of the first polarizer 41→the liquid crystal molecules corresponding to the identification subpixel →the fourth region 42b of the second polarizer 42, and reaches the photosensitive sensing unit 50, so as to perform fingerprint identification.

As shown in FIG. 4, when a finger is pressed on the light guide plate 20 (not shown in FIG. 4), the total reflection inside the light guide plate 20 is damaged at some ridge positions in the fingerprint. The detection light (marked as Light Ray 1 in FIG. 4) is emitted downward from the light guide plate 20, passes through the second region 41b of the first polarizer 41 and is polarized to be, for example, detection light in a perpendicular polarization state (shown by the symbol "⊗" in FIG. 4). The liquid crystal molecules in the identification subpixel is controlled to deflect, so that the light transmittance thereof is not zero (i.e., controlling the liquid crystal molecules in the identification subpixel in 1~255 grayscale arrangement). The detection light in a perpendicular polarization state is deflected by liquid crystal molecules to be detection light in a horizontal polarization state. Since the polarization direction of the fourth region 42b of the second polarizer 42 which is below the second region 41b is perpendicular to the polarization direction of the second region 41b, the detection light in the horizontal polarization state is able to be transmitted through the fourth region 42b and received by the photosensitive sensing unit 50 below the fourth region 42b. Since the polarization direction of the first region 41a is perpendicular to the polarization direction of the second region 41b, an oblique interfering light ray (marked as Light Ray 2 in FIG. 4) created at a boundary of a valley and a ridge passes through the first region 41a adjacent to the second region 41b, is polarized to be a light ray in horizontal polarization state (indicated by the symbol "↔" in FIG. 4), is then deflected to be a light ray in perpendicular polarization state by the liquid crystal molecules in the identification subpixel, and is not able to pass through the below fourth region 42b of the second polarizer 42 to the photosensitive sensing unit 50. That is, an optical path from the light guide plate 20 to the photosensitive sensing unit 50 is a collimation optical path. The photosensitive sensing unit 50 receives the light ray reflected at the ridge position in the fingerprint directly thereabove, and it is difficult to receive mixed light created at an adjacent boundary of a valley and a ridge, thereby avoiding crosstalk from light emitted from adjacent valleys and ridges. This improves the accuracy of the optical fingerprint identification.

It is able to refer to FIG. 1, the first polarizer 41 is disposed on a side of the first substrate (e.g., the color film substrate 12) away from the second substrate, and the second polarizer 42 is disposed on a side of the second substrate (e.g., the array substrate 13) away from the first substrate. Or, it is also able to refer to FIG. 2, the first polarizer 41 is disposed between the liquid crystal layer 11 and the first substrate (e.g., the color film substrates 12), and the second polarizer 42 is disposed between the liquid crystal layer 11 and the second substrate (e.g., the array substrate 13). It only requires that, the first polarizer 41 is disposed on one side of the liquid crystal layer 11, and the second polarizer 42 is disposed on the other side of the liquid crystal layer 11. And the specific position is able to be flexibly arranged, which is not limited herein.

Based on this, in the foregoing display device according to some embodiments of the present disclosure, display and optical fingerprint identification are integrated. Different regions, correspondingly in an upper polarizer and a lower polarizer, or in a same polarizer but corresponding to the display subpixels and the identification subpixel, have perpendicular polarization directions. By these, the design of providing a collimation optical path from the light guide plate to a photosensitive sensing unit is achieved. In this way, the crosstalk among detection light rays of the adjacent valleys and ridges in the fingerprint can be avoided, and thus the accuracy of the fingerprint identification is improved.

Figure 5:
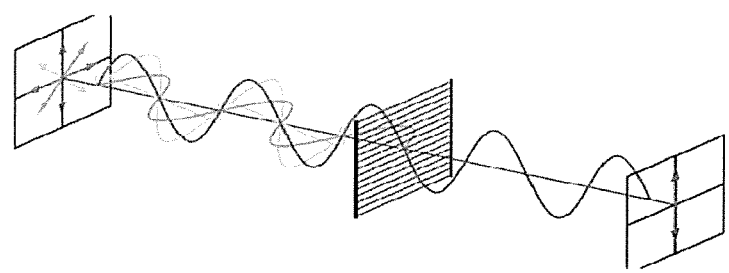
FIG. 5 is a schematic diagram of a basic principle of a wire grid polarizer in the prior art.
Figure 6:
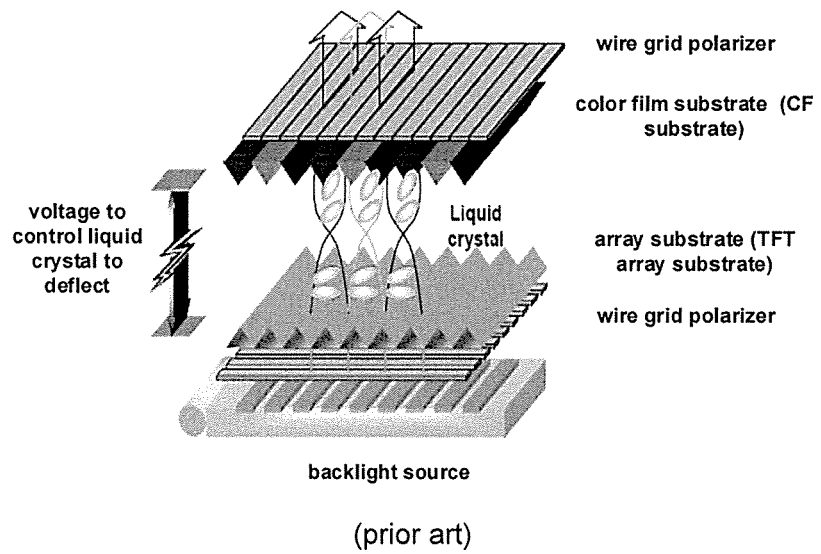
FIG. 6 is a schematic diagram of a display structure of an LCD with wire grid polarizers in the prior art.

Based on the above, as shown in FIG. 5, since a wire grid polarizer (WGP for short) is formed with a group of wires which are regularly arranged, to some extent, the metallicity in the direction perpendicular to the wires is damaged. An electromagnetic wave with an electric field direction parallel to the wires (the electric field is able to act on free electrons well) has an effect of high reflection and strong absorption. An Electromagnetic wave with an electric field direction perpendicular to the wires (motion of free electrons is limited and the electric field is limited to act on the free electrons) has an effect of high transmission and low absorption. That is, polarized light indicated by the symbol "↕" in FIG. 5 is able to pass through the wire grid, and light in all other polarization states is reflected and absorbed. The effects of the WGP on a microwave, a far-infrared and a mid-infrared are good (in such band, a wave is strongly absorbed by metal, and the wavelength thereof is much greater than a structure period of the wire grid). The polarization principle of the WGP makes the polarization effect of it less dependent on the wavelength and the incident angle. Therefore, in a LCD, as shown in FIG. 6, replacing conventional polarizers (which is formed by a PVA filter absorbing dichroic iodides or by stretching a direct dye to make dichroic substances thereof in a directional arrangement) fitted on both sides of the display panel by WGPs, can improve the transmittance.

Based on this, in some embodiments of the present disclosure, optionally, the first polarizer 41 is a first wire grid polarizer. The extension direction of wires in the first region 41a is perpendicular to the extension direction of wires in the second region 41b. The second polarizer 42 is a second wire grid polarizer. The extension direction of wires in the third region 42a is perpendicular to the extension direction of wires in the fourth region 42b. And the extension direction of the wires in the second region 41b is perpendicular to the extension direction of the wires in the fourth region 42b.

Figure 7:
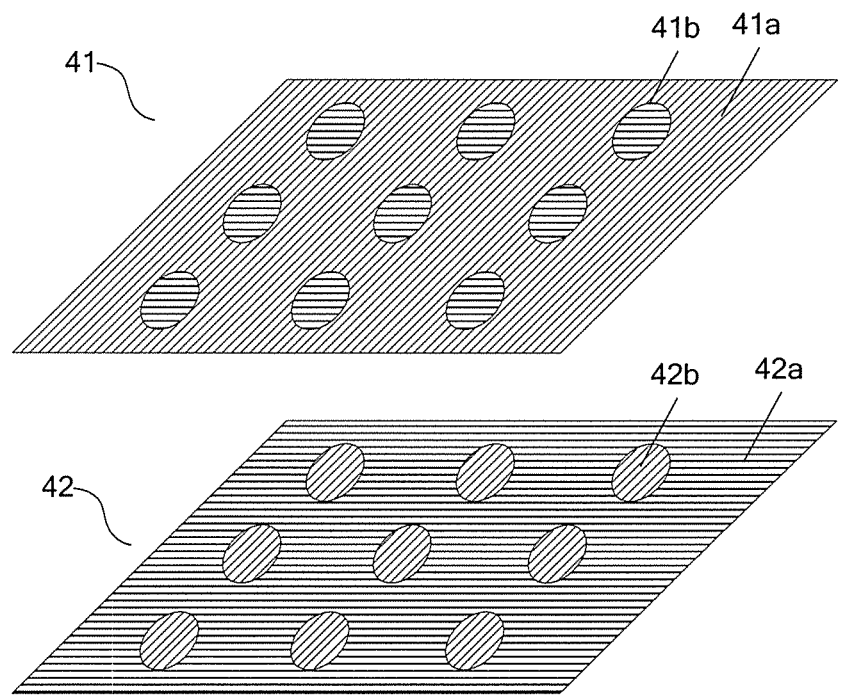
FIG. 7 is a schematic structure diagram of a first wire grid polarizer and a second grid polarizer in a fingerprint identification display device provided by some embodiments of the present disclosure.

That is, as shown in FIG. 7, in case that the wires in the first region 41a are longitudinally arranged, the wires in the second region 41b are transversely arranged; correspondingly, the wires in the third region 42a are transversely arranged, and the wires in the fourth region 42b are longitudinally arranged; and vice versa, which will not be reiterated herein.

Further, as shown in FIG. 7, shapes of the second region 41b and the fourth region 42b are circular, so as to facilitate the transmission of an optical path and simplify the preparation process of the wire grid polarizer.

Further, in order to prevent the wire grid from interfering with a perpendicular or transverse electric field that controls liquid crystal to deflect, as shown in FIG. 1, the first wire grid polarizer is optionally disposed between the display panel 10 and the light guide plate 20; and/or, the second wire grid polarizer is optionally disposed on a side of the display panel 10 away from the light guide plate 20.

Further, a light emitting component 30 is able to be arranged at an edge of the light guide plate 20 to minimize an influence on a normal display region. In addition, in order that the detection light traveling inside the light guide plate 20 covers an entire surface of the light guide plate 20 as uniformly as possible, as shown in FIG. 1 and FIG. 2, light emitting components 30 are able to be arranged at two opposite side edges of the light guide plate 20, and light emitting components 30 are also able to be arranged at four side edges of the light guide plate 20, which is not limited in the embodiments of the present disclosure.

Further, the above display panel 10 specifically includes the first substrate located on one side of the liquid crystal layer 11 and the second substrate located on the other side of the liquid crystal layer 11. The first substrate includes a plurality of color resists. The one of the plurality of color resists, which is corresponding to the identification subpixel, is transparent to reduce the absorption, by the one of the color resists, of the light reflected at the ridge positions in the fingerprint, improving the transmittance of the detection light.

As shown in FIG. 1 and FIG. 2, taking the first substrate being the color film substrate 12 and the second substrate being the array substrate 13 as an example, the color film substrate 12 includes a plurality of color resists. One of the plurality of color resists, which is corresponding to the identification subpixel, is transparent. The colors of the display subpixels in the display unit includes at least red, green, and blue.

Further, the photosensitive sensing unit 50 is specifically able to include a photosensitive diode configured to sense the detection light reflected at a ridge position in the fingerprint, and a control switch transistor configured to control the photosensitive diode to convert the received detection light into a potential to be output. The foregoing fingerprint identification display device further includes a supporting substrate 51 disposed on the side of the display panel 10 away from the light guide plate 20. The photosensitive sensing unit 50 is disposed on the supporting substrate 51, so as to facilitate arranging wiring structure, of an identification scanning line configured to load identification scanning signals to a corresponding control switch transistor, an identification output line configured to load a negative bias to a photosensitive diode by a corresponding control switch transistor or to read electrical signals output by the photosensitive diode, and the like.

Of course, the photosensitive sensing unit 50 is also able to be directly disposed on a surface of the substrate of the display panel 10 close to the backlight source, specifically, the back side of the array substrate.

Based on the above, as shown in FIG. 1 and FIG. 2, the fingerprint identification display device further includes a backlight module 60 arranged on a side of the photosensitive sensing unit 50 away from the display panel 10.

Based on the above, further, some embodiments of the present disclosure provide a driving method of the foregoing fingerprint identification display device. The method includes:

During a fingerprint identification phase, liquid crystal molecules in an identification subpixel are controlled to deflect so that detection light, which is emitted from a position in a light guide plate corresponding to a fingerprint, irradiates a photosensitive sensing unit corresponding to the identification subpixel.

In one embodiment, the identification subpixel includes a first electrode and a second electrode. The first electrode and the second electrode are configured to control the liquid crystal molecules in the identification subpixel to deflect. Further optionally, during the fingerprint identification phase, a voltage between the first electrode and the second electrode is controlled, so that a polarization direction of light, passing through the identification subpixel, deflects by 90°.

That is, the identification subpixel cooperates with polarizers on both sides, making the light transmittance maximum and displaying 255 grayscales, so that the detection light, which is emitted from the position of the light guide plate corresponding to the fingerprint, is sequentially polarized by the second region of the first polarizer, the liquid crystal molecules and the fourth region of the second polarizer, and irradiates the photosensitive sensing unit in a transmission manner of collimation optical path, to perform the corresponding fingerprint identification.

One of display subpixels includes a third electrode and a fourth electrode. The third electrode and the fourth electrode are configured to control liquid crystal molecules located in the one of the display subpixels to deflect. The third electrode and the fourth electrode are exemplarily as shown in FIG. 1, specifically, one of the third electrode 12a and the fourth electrode 12b is able to be a pixel electrode disposed on an array substrate while the other is able to be at least a part of a common electrode disposed on the array substrate, and also, one is able to be the pixel electrode disposed on the array substrate while the other is able to be at least a part of a common electrode disposed on a color film substrate. The specific structure thereof is able to follow the prior art, and the embodiments of the present disclosure do not limit it.

On the basis of this, further, as shown in FIG. 4, in order to avoid that mixed light (marked as Light Ray 3 in FIG. 4), having a larger inclination angle from an adjacent boundary of a valley and a ridge in the fingerprint, sequentially passes through a first region 41a of the first polarizer 41, a liquid crystal layer 11 and a third region 42a of the second polarizer 42, and irradiate a photosensitive sensing unit 50 adjacent to the one below a ridge position, the step of during the fingerprint identification phase, the liquid crystal molecules in the identification subpixel are controlled to deflect so that the detection light, which is emitted from the position in the light guide plate corresponding to the fingerprint, irradiates the photosensitive sensing unit corresponding to the identification subpixel, further includes: during the fingerprint identification phase, a voltage between the third electrode and the fourth electrode is controlled, so that a polarization direction of light, passing through the display subpixel, does not deflect. That is, the identification subpixel cooperates with the polarizers on both sides, making the light transmittance thereof be zero, and displaying 0 grayscale.

In this way, the detection light, emitted from the position of the light guide plate corresponding to the fingerprint, is not able to pass through the third region of the second polarizer to irradiate the photosensitive sensing unit. That is, during the fingerprint identification phase, the display subpixel displays black. Only the detection light reflected at the ridge position in the fingerprint is able to pass through the identification subpixel and irradiate the photosensitive sensing unit 50 in the transmission manner of collimation light path.

Further, the foregoing driving method further includes: during a display phase, the liquid crystal molecules in the identification subpixel are controlled to deflect, so that light emitted from a backlight module is emitted out further by passing through the second region of the first polarizer, increasing the light transmittance of the display device during the display phase.

The foregoing descriptions merely show specific implementations of the present disclosure, but the protection scope of the present disclosure is not limited thereto. Variations or replacements that can be easily conceived by any person skilled in the art within the technical scope disclosed by the present disclosure, shall fall into the protection scope of the present disclosure. Therefore, the protection scope of the present disclosure should be subject to the protection scope of the claims.

Additional embodiments including any one of the embodiments described above may be provided by the present disclosure, where one or more of its components, functionalities or structures are interchanged with, replaced by or augmented by one or more of the components, functionalities or structures of a different embodiment described above.

What is claimed is:

1. A fingerprint identification display device, which has a fingerprint identification region, comprising:
   a display panel with a liquid crystal layer packaged therein, wherein the display panel has a plurality of display units defined therein, at least some of the plurality of display units are located in the fingerprint identification region, and each of the at least some of the plurality of display units comprises display subpixels and an identification subpixel;
   a light guide plate disposed on a display side of the display panel;
   one or more light emitting components configured to make detection light emitted therefrom travel in the light guide plate in a total reflection manner;
   a first polarizer disposed between the liquid crystal layer and the light guide plate, wherein the first polarizer comprises a first region and a second region, and a polarization direction of the first region is perpendicular to a polarization direction of the second region, and
   a second polarizer disposed on a side of the liquid crystal layer away from the light guide plate, wherein the second polarizer comprises a third region and a fourth region, and a polarization direction of the third region is perpendicular to a polarization direction of the fourth region,
   wherein the first region and the third region correspond to the display subpixels, the polarization direction of the first region is perpendicular to the polarization direction of the third region, the second region and the fourth region correspond to the identification subpixel, and the polarization direction of the second region is perpendicular to the polarization direction of the fourth region; and
   a photosensitive sensing unit disposed at a side of the second polarizer away from the liquid crystal layer and corresponding to the identification subpixel.

2. The fingerprint identification display device according to claim 1, wherein the identification subpixel comprises a first electrode and a second electrode, and the first electrode and the second electrode are configured to control liquid crystal molecules in the identification subpixel to deflect.

3. The fingerprint identification display device according to claim 1, wherein,
   the first polarizer is a first wire grid polarizer; an extension direction of wires in the first region is perpendicular to an extension direction of wires in the second region;
   the second polarizer is a second wire grid polarizer; an extension direction of wires in the third region is perpendicular to an extension direction of wires in the fourth region; and
   the extension direction of the wires in the second region is perpendicular to the extension direction of the wires in the fourth region.

4. The fingerprint identification display device according to claim 3, wherein,
   the first wire grid polarizer is disposed between the display panel and the light guide plate;
   and/or,
   the second wire grid polarizer is disposed on a side of the display panel away from the light guide plate.

5. The fingerprint identification display device according to claim 1, wherein the one or more light emitting components comprises at least two light emitting components which are arranged on at least two opposite side edges of the light guide plate.

6. The fingerprint identification display device according to claim 1, wherein, the display panel comprises a first substrate located on one side of the liquid crystal layer and a second substrate located on another side of the liquid crystal layer, and the first substrate comprises a plurality of color resists, wherein one of the plurality of color resists, which is located in the identification subpixel, is transparent.

7. The fingerprint identification display device according to claim 1, wherein the fingerprint identification region is located in the whole of the display side of the display panel.

8. The fingerprint identification display device according to claim 1, wherein shapes of the second region and the fourth region are circular.

9. The fingerprint identification display device according to claim 1, further comprising a supporting substrate disposed on a side of the display panel away from the light guide plate, wherein the photosensitive sensing unit is disposed on the supporting substrate.

10. The fingerprint identification display device according to claim 1, further comprising a backlight module disposed on a side of the photosensitive sensing unit away from the display panel.

11. A driving method of the fingerprint identification display device according to claim 1, comprising:

during a fingerprint identification phase, controlling liquid crystal molecules in an identification subpixel to deflect, so that detection light, which is emitted from a position in a light guide plate corresponding to a fingerprint, irradiates a photosensitive sensing unit corresponding to the identification subpixel.

12. The driving method according to claim 11, wherein, the identification subpixel comprises a first electrode and a second electrode which are configured to control the liquid crystal molecules in the identification subpixel to deflect, and the step of during the fingerprint identification phase, controlling the liquid crystal molecules in the identification subpixel to deflect, so that the detection light, which is emitted from the position in the light guide plate corresponding to the fingerprint, irradiates the photosensitive sensing unit corresponding to the identification subpixel, comprises: during the fingerprint identification phase, controlling a voltage between the first electrode and the second electrode, so that a polarization direction of light, passing through the identification subpixel, deflects by 90°.

13. The driving method according to claim 11, wherein, one of display subpixels comprises a third electrode and a fourth electrode which are configured to control liquid crystal molecules located in the one of the display subpixels to deflect, and the step of during the fingerprint identification phase, controlling the liquid crystal molecules in the identification subpixel to deflect, so that the detection light, which is emitted from the position in the light guide plate corresponding to the fingerprint, irradiates the photosensitive sensing unit corresponding to the identification subpixel, further comprises: during the fingerprint identification phase, controlling a voltage between the third electrode and the fourth electrode, so that a polarization direction of light, passing through the one of the display subpixels, does not deflect.

14. The driving method according to claim 11, further comprising:

during a display phase, controlling the liquid crystal molecules in the identification subpixel to deflect, so that light, emitted from a backlight module, is emitted out further by passing through a second region of a first polarizer.

* * * * *